United States Patent
Tsou

(10) Patent No.: US 8,102,072 B2
(45) Date of Patent: Jan. 24, 2012

(54) AERODYNAMIC VIBRATION POWER-GENERATION DEVICE

(76) Inventor: Kuei-Sheng Tsou, Hsinchu (TW)

( * ) Notice: Subject to any disclaimer, the term of this patent is extended or adjusted under 35 U.S.C. 154(b) by 496 days.

(21) Appl. No.: 12/346,880

(22) Filed: Dec. 31, 2008

(65) Prior Publication Data

US 2010/0164231 A1    Jul. 1, 2010

(51) Int. Cl.
*F03B 13/00*    (2006.01)
(52) U.S. Cl. .......................................... 290/55; 310/330
(58) Field of Classification Search .................... 290/55
See application file for complete search history.

(56) References Cited

U.S. PATENT DOCUMENTS

| | | | | |
|---|---|---|---|---|
| 3,500,451 A | * | 3/1970 | Yando | 310/330 |
| 4,387,318 A | * | 6/1983 | Kolm et al. | 310/330 |
| 4,536,674 A | * | 8/1985 | Schmidt | 310/330 |
| 7,368,860 B2 | * | 5/2008 | Wood et al. | 310/367 |
| 7,626,281 B2 | * | 12/2009 | Kawai | 290/54 |
| 7,772,712 B2 | * | 8/2010 | Frayne | 290/1 R |
| 2007/0228890 A1 | * | 10/2007 | Zanella et al. | 310/339 |
| 2008/0277941 A1 | * | 11/2008 | Bowles et al. | 290/54 |

FOREIGN PATENT DOCUMENTS

| | | | |
|---|---|---|---|
| EP | 725452 A1 | * | 8/1996 |
| JP | 11303726 A | * | 11/1999 |

* cited by examiner

*Primary Examiner* — Joseph Waks

(57) ABSTRACT

An aerodynamic vibration power-generation device is provided, including at least a brace, and at least a blade. The blade is attached to the brace at least with one side. The blade is an aerodynamic vibration element, with at least an embedded piezoelectric transducer. The piezoelectric transducer embedded in the blade includes related circuitry for electrically connecting to a load unit. When the airflow passes along the surfaces of the blade, the difference between the air speeds on both sides of the blade will generate a pressure difference on the surfaces of the blade, according to Bernoulli's Principle, and the pressure difference will cause the blade to deform and vibrate. The fluttering and the oscillation of the blade caused by the continuously changing airflow speeds will cause the embedded piezoelectric transducer to generate electricity.

10 Claims, 5 Drawing Sheets

AERODYNAMIC VIBRATION POWER-GENERATION DEVICE

FIELD OF THE INVENTION

The present invention generally relates to an electricity-generating device, and more specifically to a device having a piezoelectric transducer embedded inside a blade, the piezoelectric transducer generating electricity when the blade vibrating because of the continuously changing pressure difference on the surfaces of blade caused by the continuously changing airflow speed difference on the surfaces of the blade.

BACKGROUND OF THE INVENTION

As the alternative energy gains popularity, the use of wind for generating electricity also attracts attention. The wind-based electricity-generation is to use the windmill to transform the wind energy into the rotational dynamics, and then use a generator module to transform the mechanical energy into electrical energy. This type of generator has a better capacity. However, the disadvantages are the low efficiency, large size, complex structure and high manufacturing cost.

Piezoelectric material, such as Lead Zirconate-titanate (PZT), $BaTiO_3$, quartz, ZnO, or other special chemical compounds (PVDF), and so on, is a material that is able to generate electric charge when the material is deformed by external forces, called Piezoelectric Effect, so that the mechanical energy can be transformed into electrical energy. As the rapid development in applications, some piezoelectric materials can be made into any special forms, such as a thin foil or fiber. Therefore, piezoelectric materials are made into transducers in some power-transformation devices to utilize the environmental forces, such as tide, wind, turbine, and so on, to impact the transducer for harvesting renewable energy into electrical energy. However, the efficiency has been poor so far.

It is therefore imperative to devise an aerodynamic vibration power-generation device with piezoelectric transducer embedded inside a blade to improve the power generation capability.

SUMMARY OF THE INVENTION

The primary object of the present invention is to provide an aerodynamic vibration power-generation device, having at least a piezoelectric transducer embedded inside a blade. The blade is an aerodynamic vibration element that has the capability of airflow spoiling and fluttering. When the airflow passes along the surfaces of the blade, the difference between the air speeds on both sides of the blade will generate a pressure difference on the surfaces of blade, according to Bernoulli's Principle, and the pressure difference will cause the blade to deform and vibrate. The deformation and the vibration of the blade will also cause the embedded piezoelectric transducer to deform and vibrate. The vibration of the piezoelectric material will have the Piezoelectric Effect to generate electric charges. Because the wind speed is constantly changing, the airflow speeds and the pressure difference on the surfaces of the blade are also continuously changing accordingly. The continuously changing pressure difference on the surfaces of blade will sustain the blade for continuous vibration so that the embedded piezoelectric transducer continues to oscillate to generate charges.

Another object of the present invention is to provide an aerodynamic vibration power-generation device with a wide range of applications. When in use, the aerodynamic vibration power-generation device can be operated stand-alone, or a plurality of aerodynamic vibration power-generation devices of the present invention can be combined in parallel. Alternatively, a frame can also be used to bind a plurality of aerodynamic vibration power-generation devices to form a large-size electricity-generating set and the aerodynamic vibration power-generation device becomes an electricity-generating element of the large-size electricity-generating set.

To achieve the above objects, the present invention provides an aerodynamic vibration power-generation device, including at least a brace, and at least a blade. The blade is attached to the brace with at least one side. The blade is an aerodynamic vibration element, with at least an embedded piezoelectric transducer. The piezoelectric transducer embedded in the blade has related circuitry for electrically connecting to a load.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
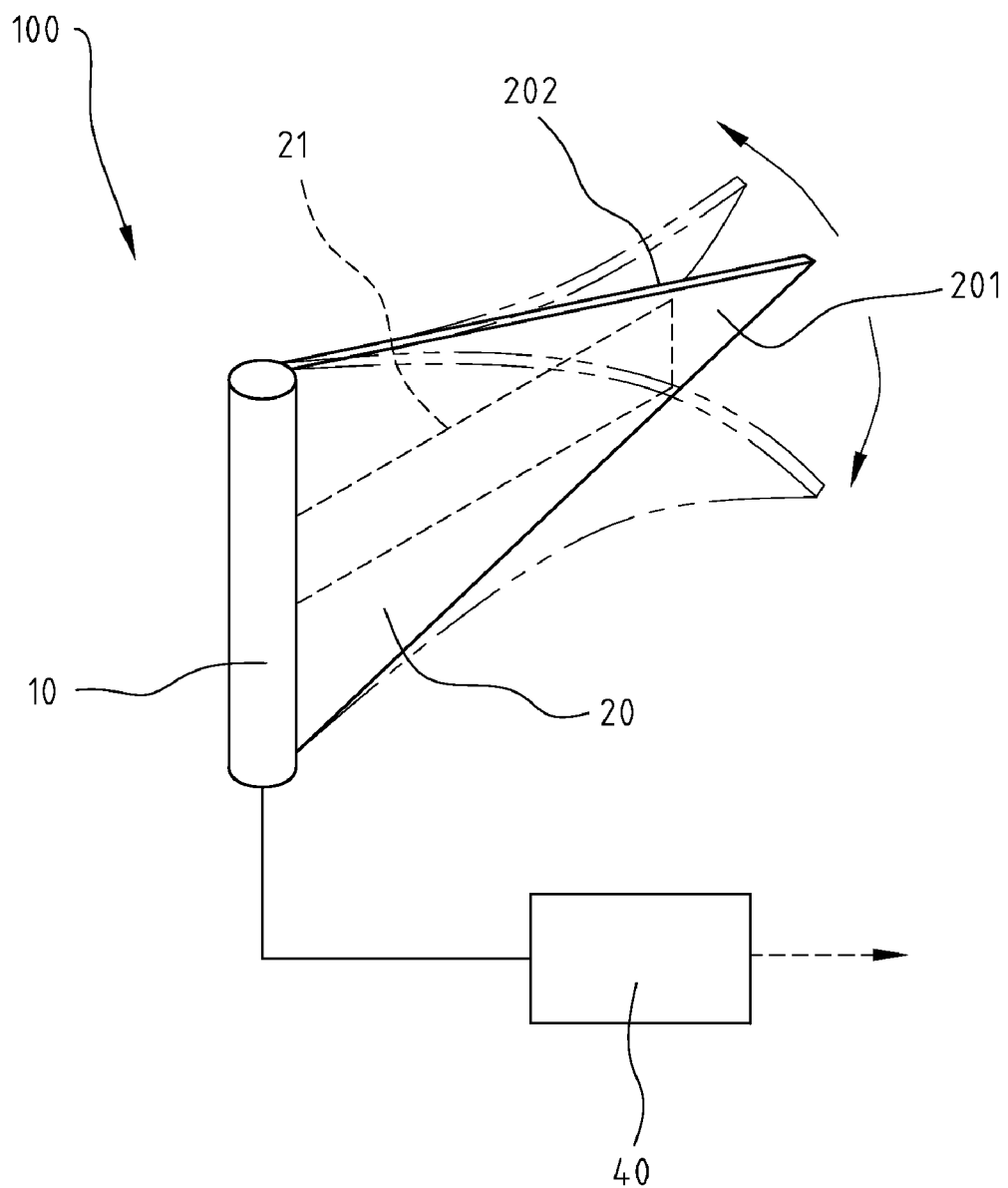
FIG. 1 shows a schematic view of the first embodiment of the present invention.

FIG. 1 shows a schematic view of the first embodiment of the present invention. As shown in FIG. 1, an aerodynamic vibration power-generation device 100 of the present invention includes at least a brace 10, and at least a blade 20. One side of blade 20 is attached to brace 10. Blade 20 is a thin and flexible aerodynamic vibration element with at least an embedded piezoelectric transducer 21. Piezoelectric transducer 21 is made of piezoelectric material and electrodes, and is deflectable and flexible. When piezoelectric transducer 21 is vibrated because of the vibration of blade 20, piezoelectric transducer 21 will transform the mechanical energy of vibrating blade 20 into electrical energy and output electric current. Piezoelectric transducer 21 also has related circuitry to connect with a load unit 40. When the present invention is operated stand-alone, the first stage of load unit 40 can be an impedance load, a converter, a battery charging system with battery, a regulator, an inverter, and so on.

Figure 2:
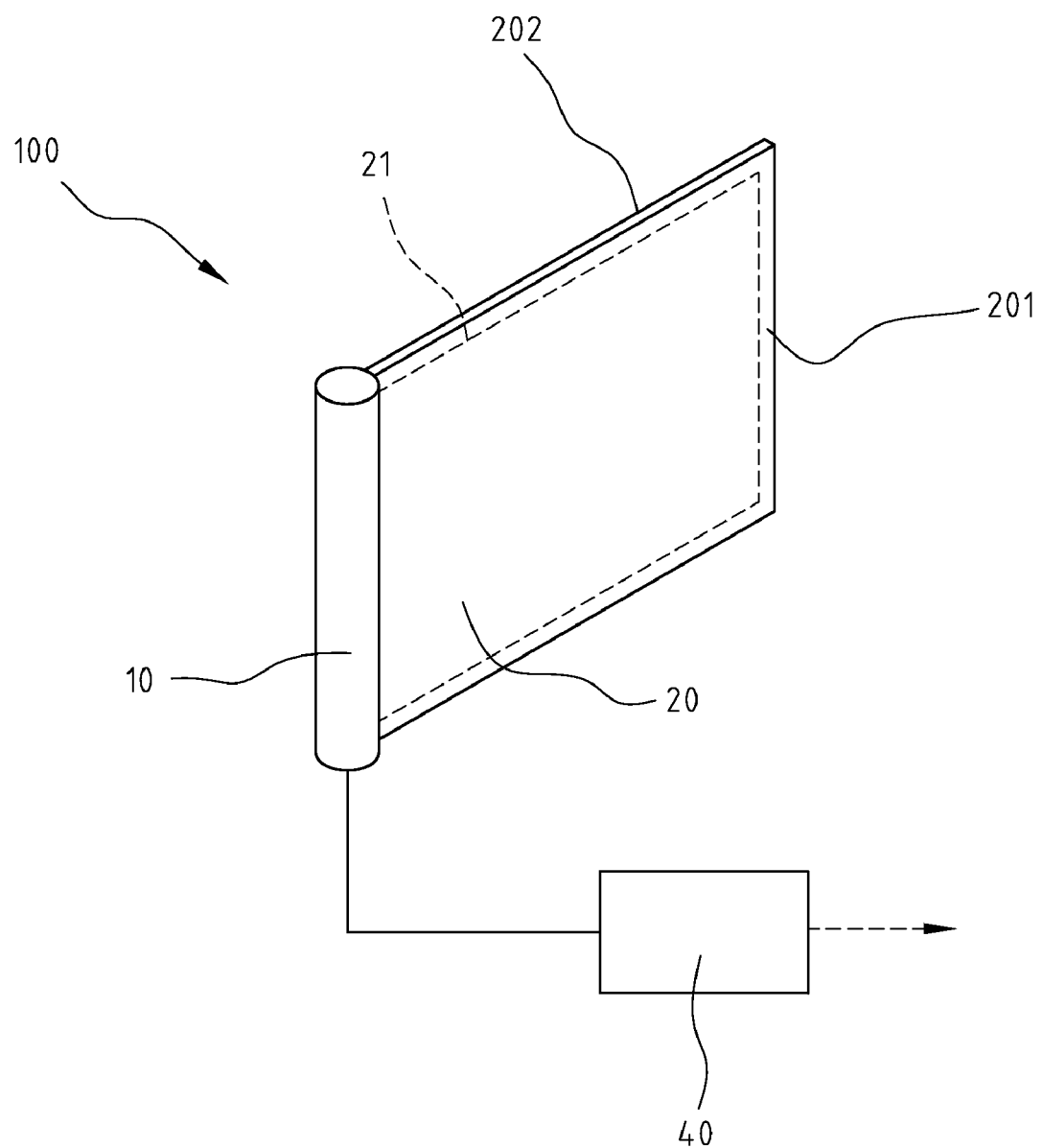
FIG. 2 shows a schematic view of the second embodiment of the present invention.

Blade 20 can be made of plastic, composite-polymer, textile, or non-woven material, and so on. Piezoelectric transducer 21 is embedded inside the above materials. The plastic, composite-polymer, textile or non-woven material is to form blade 20 with the functionality of airflow spoiling and fluttering, protecting embedded piezoelectric transducer 21 as well as enhancing the mechanical strength and insulation of piezoelectric transducer 21. In the present embodiment, only a part of blade 20 embeds piezoelectric transducer 21; therefore, the size of piezoelectric transducer 21 is smaller than the size of blade 20. But the present invention is not limited to such an embodiment. As shown in FIG. 2, the shape and the size of piezoelectric transducer 21 can be similar or identical to the shape and the size of blade 20. The larger the area of piezoelectric transducer 21 is, the more the output electricity will be.

Figure 3:
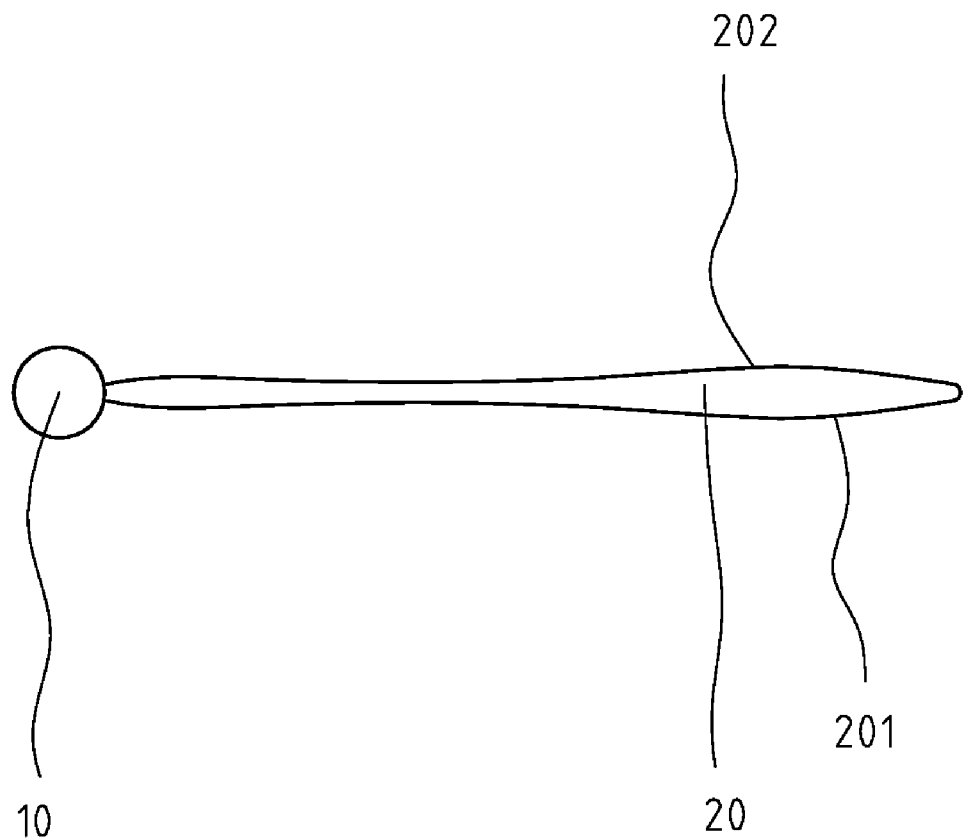
FIG. 3 shows a top view of the third embodiment of the present invention.

Blade 20 of the present invention is not limited to any specific shape. The shape of blade 20 of FIG. 1 is triangular, and the shape of blade 20 of another embodiment of the present invention in FIG. 2 is rectangular. However, blade 20 can also be of other shapes, such as square, arc, or irregular. Blade 20 includes two opposite large-area surfaces 201, 202. Surfaces 201, 202 are the surfaces where the airflow passes along. The form of surfaces 201, 202 is not limited to any specific shape. In addition, surfaces 201, 202 can be either smooth or rough. FIG. 3 shows a top view of an embodiment of the present invention. As shown in FIG. 3, surfaces 201, 202 of blade 20 are symmetric curvy surfaces, while in FIG. 1 and FIG. 2, surfaces 201, 202 of blade 20 are symmetric flat surfaces. However, the two surfaces of blade 20 can be also asymmetric (not shown), such as, one surface is a flat surface and the other is a curvy surface, or both curvy surfaces and yet with different curvatures.

Figure 4:
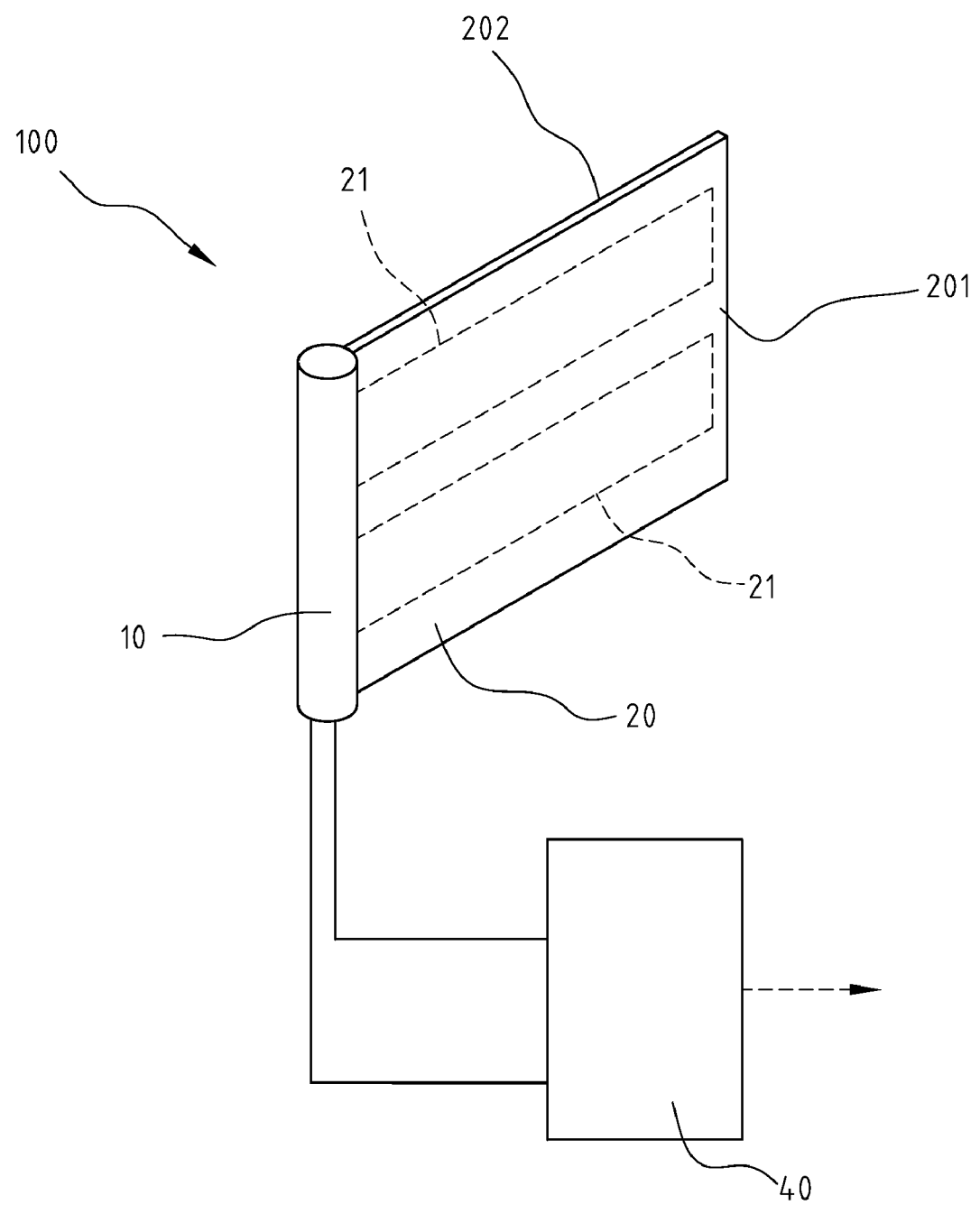
FIG. 4 shows a schematic view of the fourth embodiment of the present invention.

The number of piezoelectric transducer 21 embedded inside blade 20 of the present invention can be one, such as in FIG. 1 and FIG. 2. But the number of piezoelectric transducer 21 is not limited to any specific number. FIG. 4 shows a schematic view of an embodiment of the present invention with two piezoelectric transducers. As shown in FIG. 4, blade 20 embeds two piezoelectric transducers 21. It is obvious that the number, size and the shape of piezoelectric transducer 21 are not limited to any specific settings. The object is to allow the designer to design the number, size and the shape of piezoelectric transducer 21 according to the shape, size, material and characteristics of blade 20, and the characteristics of piezoelectric transducer 21 for optimal energy transformation efficiency of aerodynamic vibration power-generation device 100 to achieve maximum electricity output. It is worth noting that the choice of load unit 40 is different for the present invention with a single piezoelectric transducer and with plural piezoelectric transducers. Unlike the embodiment in FIG. 1 where blade 20 only embeds a piezoelectric transducer, in the embodiment with more than one piezoelectric transducer, the first stage of load unit 40 must be a converter, which can be then connected to an impedance load, a battery charging system with battery, a regulator, an inverter, and so on.

Figure 5:
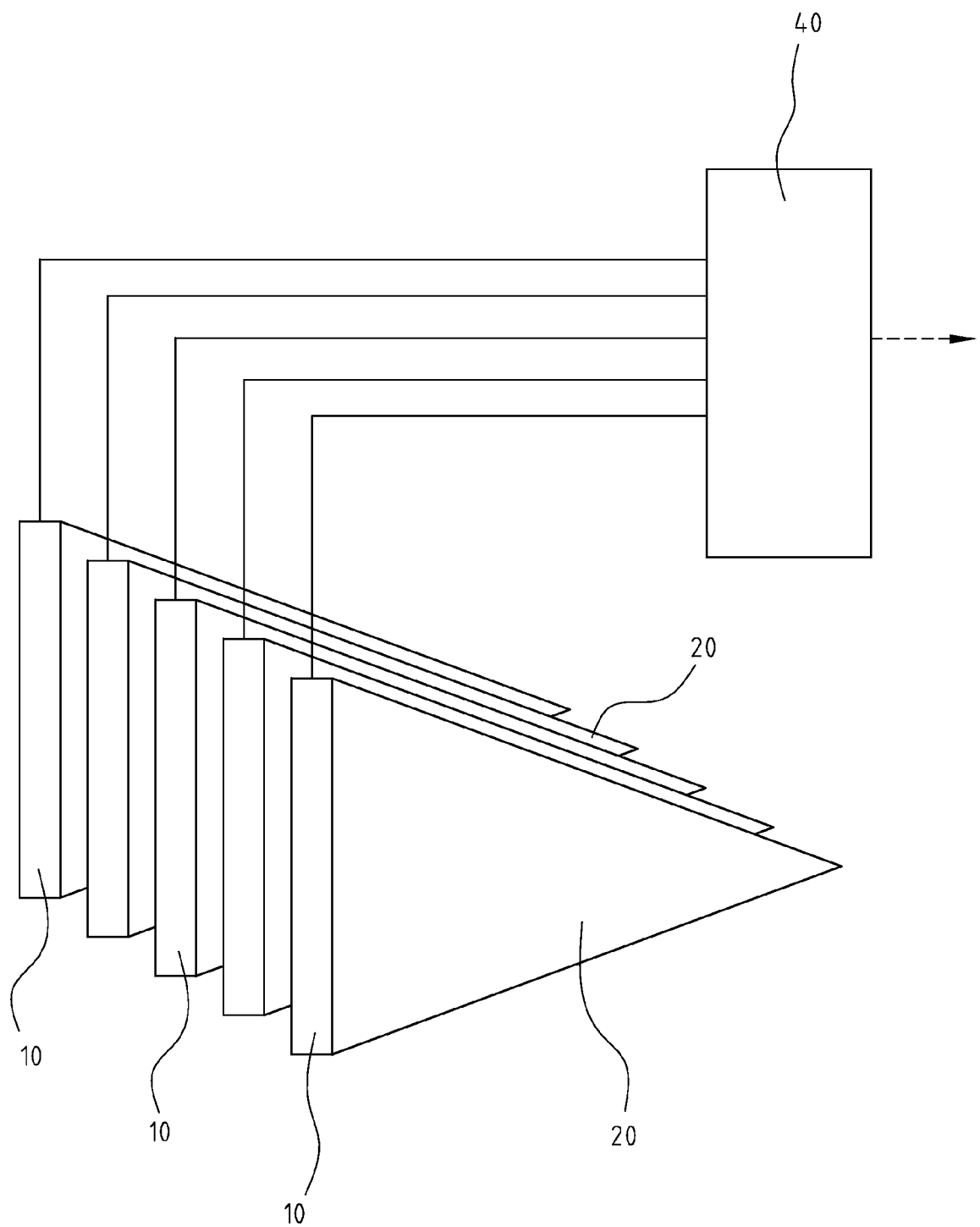
FIG. 5 shows a schematic view of a plurality of aerodynamic vibration power-generation devices of the present invention connected in parallel.

FIG. 5 shows a schematic view of an embodiment with a plurality of aerodynamic vibration power-generation devices of the present invention connected in parallel. As shown in FIG. 5, a plurality of braces 10 fixing a plurality of blades 20 is connected to a load unit 40. It is also worth noting that the first stage of load unit 40 must be a converter, as in the embodiment of a blade with plural embedded piezoelectric transducers.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An aerodynamic vibration power-generation device, comprising:
    at least a brace; and
    at least a blade, with at least one side attached to said brace, being an aerodynamic vibration element, having at least a piezoelectric transducer embedded inside said blade with areas of said blade extending directly above and below said piezoelectric transducer; said embedded piezoelectric transducer further having related circuitry electrically connected to a load unit;
    wherein when airflow passes along two sides of said blade, a difference between air speed on two surfaces of said blade generates a pressure difference, and continuously changing air speed generates a continuous pressure difference to cause said blade to deform and vibrate, which makes said embedded piezoelectric transducer deform and vibrate to generate electric current.

2. The device as claimed in claim 1, wherein said blade has the functionality of airflow spoiling and fluttering.

3. The device as claimed in claim 1, wherein only a part of said blade embeds said piezoelectric transducer.

4. The device as claimed in claim 1, wherein the shape of said embedded piezoelectric transducer is similar to the shape of said blade.

5. The device as claimed in claim 1, wherein the shape of said embedded piezoelectric transducer is identical to the shape of said blade.

6. The device as claimed in claim 1, wherein the shape of said embedded piezoelectric transducer is different from the shape of said blade.

7. The device as claimed in claim 1, wherein said two surfaces of said blade are identical.

8. The device as claimed in claim 1, wherein said two surfaces of said blade are non-identical.

9. The device as claimed in claim 1, wherein said two surfaces of said blade are smooth.

10. The device as claimed in claim 1, wherein said two surfaces of said blade are rough.

* * * * *